(12) United States Patent
Curran et al.

(10) Patent No.: US 6,882,205 B2
(45) Date of Patent: Apr. 19, 2005

(54) LOW POWER OVERDRIVEN PASS GATE LATCH

(75) Inventors: Brian W. Curran, Saugerties, NY (US); Edward T. Malley, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 79 days.

(21) Appl. No.: 10/290,636

(22) Filed: Nov. 8, 2002

(65) Prior Publication Data

US 2004/0090257 A1 May 13, 2004

(51) Int. Cl.$^7$ ................................................. G06F 1/04
(52) U.S. Cl. ....................................... 327/291; 361/91.1
(58) Field of Search ................................. 327/172, 176, 327/202–203, 208, 210–212, 214–215, 218–219, 291–293, 295, 386, 389; 361/91.1

(56) References Cited

U.S. PATENT DOCUMENTS 6,222,387 B1 * 4/2001 Meng et al. .................. 326/83
6,342,996 B1 * 1/2002 Drapkin et al. ............. 361/91.1
6,362,942 B2 * 3/2002 Drapkin et al. ................ 361/90
6,392,573 B1 * 5/2002 Volk ............................ 341/118
6,556,487 B1 * 4/2003 Ratnakumar et al. .. 365/189.08
6,583,646 B1 * 6/2003 Patel et al. .................... 326/80

* cited by examiner

*Primary Examiner*—My-Trang Nuton
(74) *Attorney, Agent, or Firm*—Lynn L. Augspurger

(57) ABSTRACT

A clocking circuit decreases the load on the local clock signals to save power. The load is decreased by altering the structure of the latches. Typically, a passgate style latch is used where both an NFET and a PFET are used to control dataflow. Here, the PFET has been removed and the load is decreased. However, it is difficult to pass a logical 1 through an NFET and this increases both the rising slew and rising edge delay through the latch. The effect is mitigated, though, by overdriving the local clock block (LCB) local clocks to drive a local clock to the latches by passgates using only NFET transistors in the master latches and slave latches. Overdrivig the NFET gate allows the NFET to pass a full-level logical 1 signal.

10 Claims, 2 Drawing Sheets

LOW POWER OVERDRIVEN PASS GATE LATCH

FIELD OF THE INVENTION

This invention relates to local clock distribution and low power circuit design.

Trademarks: IBM® is a registered trademark of International Business Machines Corporation, Armonk, N.Y., U.S.A. Other names may be registered trademarks or product names of International Business Machines Corporation or other companies.

BACKGROUND

In modern CMOS microprocessors, an important new design obstacle has begun to emerge. Circuits cannot simply be optimized for delay—power consumption is now an additional critical parameter. In modern CMOS microprocessors, a significant portion of the power is dissipated in the clock distribution network, specifically in the local clock nets which drive the latches. With feature sizes decreasing and scale of integration increasing, this problem will continue to worsen. Thus, it can be concluded that improvements in clock distribution techniques, especially local clock distribution, have the potential to lead to major power savings in CMOS microprocessors.

SUMMARY OF THE INVENTION

This invention exploits the characteristic that power is directly proportional to load and decreases the load on the local clock signals to save power. The load is decreased by altering the structure of the latches. Typically, a passgate style latch is used where both an NFET and a PFET are used to control dataflow. Here, the PFET has been removed and the load is decreased. However, it is difficult to pass a logical 1 through an NFET and this increases both the rising slew and rising edge delay through the latch. The effect is mitigated, though, by overdriving the local clock block (LCB). Increasing the voltage swing by approximately 20% allows the NFET to pass a full-level logical 1 signal.

These and other improvements are set forth in the following detailed description. For a better understanding of the invention with advantages and features, refer to the description and to the drawings.

Our detailed description explains the preferred embodiments of our invention, together with advantages and features, by way of example with reference to the drawings.

DETAILED DESCRIPTION OF THE INVENTION

Figure 1:
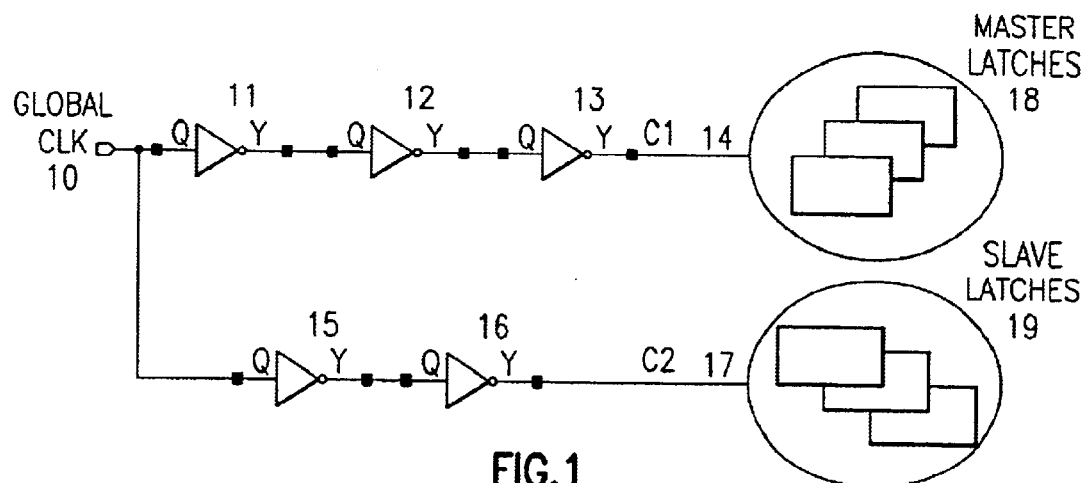
FIG. 1 illustrates a prior art LCB and latch.

Referring to FIG. 1, the prior-art clock block distributes and repowers a global clock to master and slave latches. The global clock 10 is repowered by inverters 11, 12 and 13 to create a local c1 clock 14 which is inverted with respect to the global clock 10. Global clock 10 is also repowered by inverters 15 and 16 to create a local c2 clock 17 which is not inverted with respect to the global clock 10. The local c1 clock 14 is driven through local wires to the local master latches 18. The local c2 clock 17 is driven through local wires to the local slave latches 19.

Figure 2:
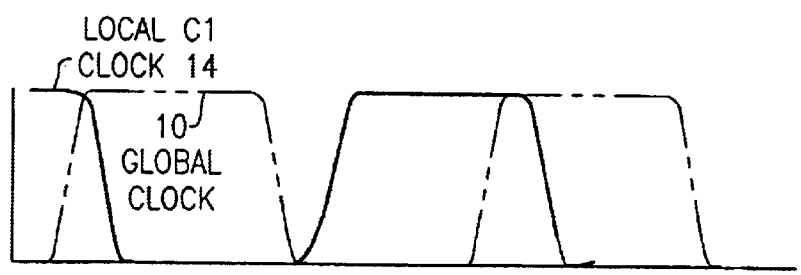
FIG. 2 illustrates the prior art clock circuit input and output waveforms.

Referring to FIG. 2, the prior-art clock block outputs two local clocks. The local c1 clock 14 and local c2 clock 17 have different phases than the global clock 10; but these output clocks have the same period (and frequency) as the global clock 10.

Figure 3:
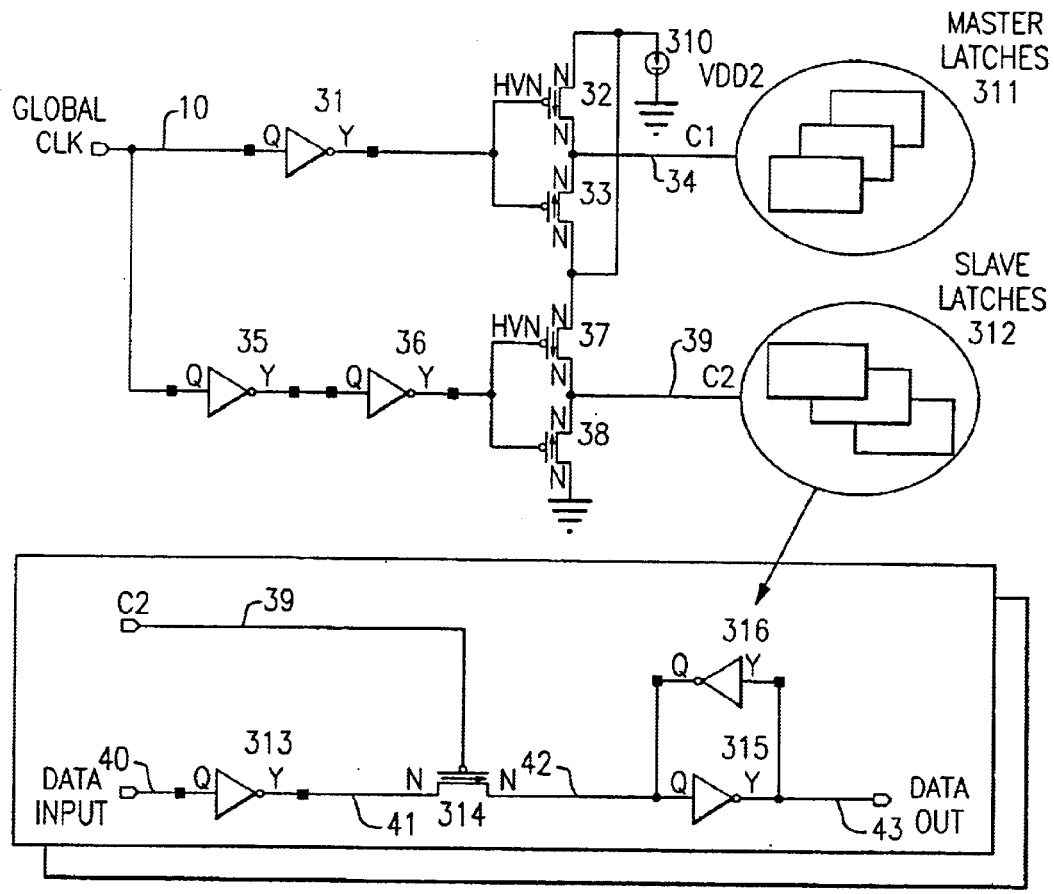
FIG. 3 illustrates the overdriven LCB and latch.

Referring to FIG. 3, the overdriven LCB drives a overvoltage clock to the latches. This is accomplished via a high voltage source (Vdd2>Vdd) which is connected to the sources of the PFETs of the last inverter stages. As shown in FIG. 3, high voltage source 310 is connected to the sources of PFET 32 and PFET 37. Local c1 clock 34 transitions from ground to the potential of the high voltage source. Local c2 clock 39 likewise transitions from ground to the potential of the high voltage source. Local c1 clock 34 is distributed via local wires to the master latches 311 and local c2 clock 39 is distributed via local wires to the slave latches 312. The master latches 311 and slave latches 312 consist of an input inverter 313 which buffers the latch data input 40, an NFET pass transistor 314 and a pair of cross-coupled inverters 315 and 316. The local c2 clock 39 is connected to the gate of NFET pass transistor 314 which has a characteristic threshold voltage, Vt. Slave latches 312 are opened when NFET pass transistor 314 is ON which allows the potential on latch node 41 to be 'passed' to latch node 42. When latch node 41 is at ground potential the NFET pass transistor 314 pulls latch node 42 to ground. However, when latch node 41 is at Vdd potential the NFET pass transistor 314 can turn off prematurely, before latch node 42 reaches Vdd potential. The turn off occurs when the gate of NFET pass transistor 314 is one threshold voltage above latch node 42. Premature turnoff can be avoided by selecting a high voltage source Vdd2 which is greater than Vdd+Vt. It is desirable for latch node 42 to reach Vdd potential for two reasons. First, it results in faster latch operation since the inverter 315 switches more quickly to drive the latch data out 43. Second, it guarantees correct latch operation. Consider the case where latch node 42 is driven to a potential <Vdd. This results in a driver contention situation whereby the inverter 316 is pulling latch node 42 down to ground and the NFET pass transistor 314 is weakly ON and attempting to pull latch node 42 up. This driver contention problem can be overcome by overdriving the gate of NFET pass transistor 314 such that it is strongly ON.

Figure 4:
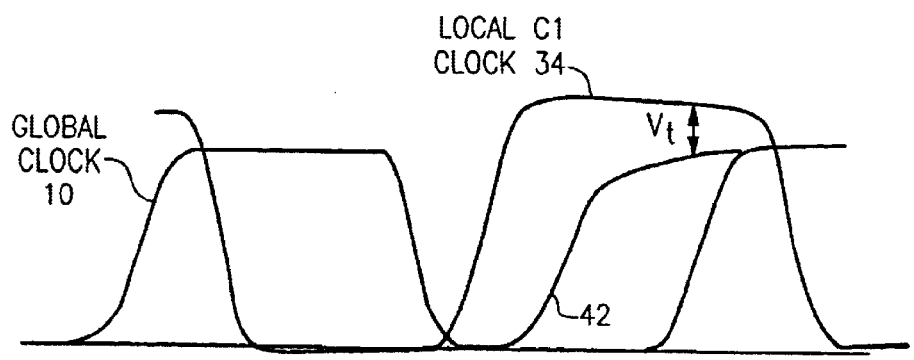
FIG. 4 illustrates the overdriven LCB and latch circuit input and output waveforms.

A potential leakage situation can occur in the output inverter stage of the LCB. Consider PFET 32 whose gate is driven to potential Vdd (because inverter 31 is supplied by the Vdd source.) PFET 32 source always at Vdd2 potential. Thus, PFET 32 will always be ON if Vdd2>Vdd−Vtp, where Vtp is the PFETs threshold voltage. A DC current path from supply Vdd2 to ground will thus exist when NFET 33 is turned ON. To avoid this situation the threshold of PFET 32 can be decreased to a value less than Vdd−Vdd2. Such a PFET is often referred to as a high threshold PFET since it has a higher absolute threshold voltage. Referring to FIG. 4, a overdriven local c1 clock 34 is generated by the disclosed LCB and latch node 42 is fully pulled to Vdd.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A clocking circuit for generating an overvoltage clock, comprising:

a global clock input, a first inverter, an intermediate clock node, a second inverter, a ground rail, a first voltage rail, a second voltage rail, an overvoltage clock node, wherein said global clock input is coupled to said first inverter, said first inverter is coupled to said ground rail, said first voltage rail and said intermediate clock node, and wherein said intermediate clock node is coupled to said second inverter, said second inverter is coupled to said ground rail, said second voltage rail and to said overvoltage clock node and said overvoltage clock node is coupled to a NFET pass gate latch circuit with an increasing voltage swing enabling said pass gate to pass a full level logical signal through said NFET pass gate latch circuit.

2. The clocking circuit according to claim 1 wherein said second inverter is comprised of an NFET, and a PFET, wherein said NFET is coupled to said ground rail, and said PFET is coupled to said second voltage rail.

3. The clocking circuit according to claim 2 wherein said PFET has a high threshold voltage.

4. The clocking circuit according to claim 3 wherein said second voltage rail has a higher potential than said first voltage rail.

5. The clocking circuit according to claim 1 wherein said overvoltage clock node is coupled to said NFET pass-gate latch circuit comprising, a latch data input, an NFET pass gate, and a pair of cross-coupled inverters.

6. The clock circuit according to claim 5 wherein the latch data input is coupled to said NFET pass gate, and said overvoltage clock node is also coupled to said NFET pass gate, while said NFET pass gate is coupled to said pair of cross-coupled inverters.

7. The clock circuit according to claim 6 wherein said pass-gate latch circuit controls dataflow and the effect of rising slew and rising edge delay through the pass-gate latch circuit is mitigated by overdriving the overgoltage clock node and using only NFET transistors in master and slave pass-gate latches whereby inncreasing the voltage swing allows the NFET of the pass-gate latch circuit to pass a full-level logical signal.

8. The clock circuit according to claim 7 wherein said overvoltage clock node is provided with a high voltage source (Vdd2>Vdd) which is connected to the sources of the PFETs of the second inverter having a high voltage source connected to the sources of the second inverter's PFET, and providing clock transitions from ground to the potential of the high voltage source, whereby clock transitions from ground to the potential of the high voltage source is distributed via wires to the pass-gate latches coupled to said overvoltage clock node.

9. The clock circuit according to claim 8 wherein said pass-gate latch circuit which buffers the latch data input.

10. The clock circuit according to claim 9 wherein there is provide slave latches coupled to an overvoltage clock node each are opened when said NFET pass gate is ON which allows the potential on a data input latch node to be 'passed' via said NFET pass gate to a slave latch node, and when said slave latch node is at ground potential the NFET pass gate pulls slave latch node to ground, but when slave latch node is at Vdd potential the NFET pass gate could turn off prematurely, before slave latch node reaches Vdd potential, but such turnoff is avoided by selecting a high voltage source Vdd2 for the PFET of said second inverter.

* * * * *